Feb. 4, 1969
R. E. TRIBOULET
3,425,605
TIRE CARRIER
Filed Sept. 5, 1967
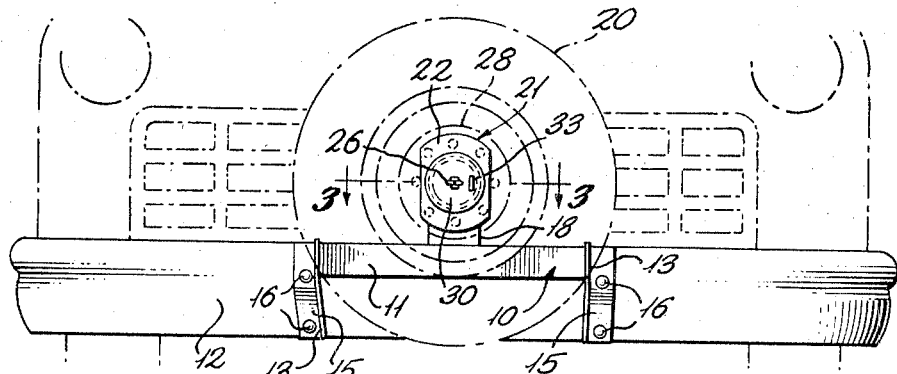
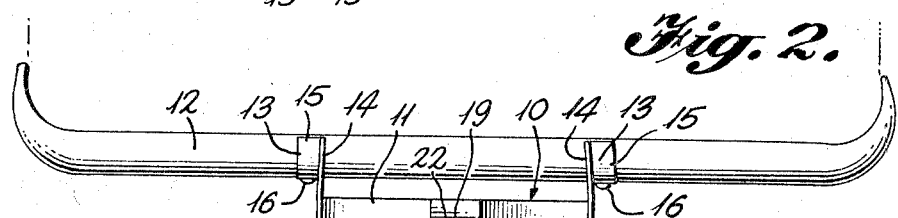
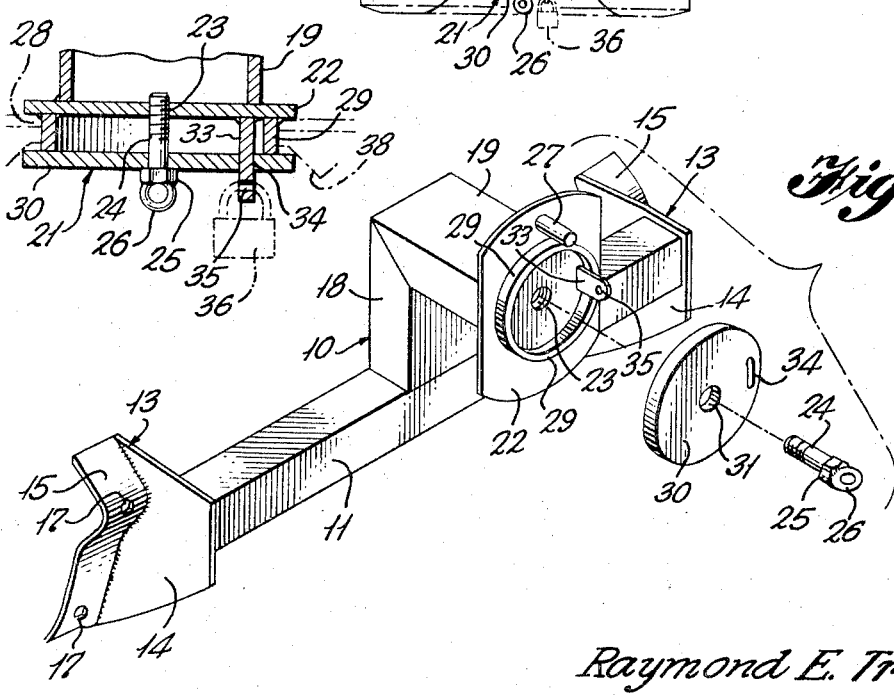
INVENTOR
Raymond E. Triboulet
BY B. P. Fishburne, Jr.
ATTORNEY

United States Patent Office 3,425,605
Patented Feb. 4, 1969

3,425,605
TIRE CARRIER
Raymond E. Triboulet, Yakima, Wash., assignor to
Triboulet Bros., Yakima, Wash., a partnership
Filed Sept. 5, 1967, Ser. No. 665,617
U.S. Cl. 224—42.06
Int. Cl. B62d 43/02; B60r 19/02
5 Claims

ABSTRACT OF THE DISCLOSURE

A spare wheel and tire carrier particularly for pick-up trucks having camper bodies characterized by extreme simplicity of construction, sturdiness and easy access. The wheel and tire carrier is mounted on the front bumper of the vehicle resulting in improved weight distribution and steering, as well as saving of wear on tires.

Background of the invention

Most pick-up trucks make provision for carrying the spare wheel and tire underneath the truck body. In case of a flat tire or other like difficulty, it can be very awkward to remove the spare wheel and tire from its mounting. In the case of pick-up trucks equipped with camper bodies and the like, weight distribution is less than ideal and it is desirable to increase the weight on the front steering wheels. These two deficiencies have given rise to the present invention in addition to the need for a sturdy and conveniently arranged tire carrier which is easy to install and will not interfere in any respect with the operation of the vehicle.

In general, the prior art devices are more complicated and costly and do not satisfy the main needs of the art regarding easy access and distribution of weight and sturdiness.

Summary of the invention

In accordance with the invention, a spare wheel and tire carrier is bolted to the front bumper of a pick-up truck and part of the weight is supported by contoured brackets which conform to the molded shape of the bumper. Existing bumper bolts may be used to mount the attachment. The spare wheel and tire are positioned sufficiently above and in advance of the bumper to allow adequate clearance below the tire and to avoid interference with the bumper. The attachment does not interfere with normal cooling of the vehicle. Additionally, the attachment provides a front end counterbalancing weight to make up for the additional length and weight of the camper's coach or body on the rear of the pick-up truck.

Brief description of the drawing

FIGURE 1 is a front elevational view of the tire carrier mounted upon the vehicle front bumper;

FIGURE 2 is a fragmentary plan view of the invention;

FIGURE 3 is an enlarged fragmentary horizontal cross section taken on line 3—3 of FIGURE 1; and FIGURE 4 is an exploded perspective view of the invention.

Description of the preferred embodiment

Referring to the drawings, wherein like numerals designate like parts, the wheel and tire carrier attachment is shown in its entirety at 10 and comprises a sturdy, transverse, horizontal support bar 11 which may be of hollow box construction for the sake of lightness and rigidity. The support bar 11 is located substantially at the top of the front bumper 12 of the pick-up truck and slightly in advance of the bumper, as depicted in FIGURE 2. The bar 11 spans about one-third of the bumper length at the center thereof, as shown.

Sturdy mounting brackets 13 are welded to the opposite ends of the support bar 11 and include vertical webs 14 and contoured extension plates 15 rigid with the plate 14 and projecting at right angles thereto. The plates 15 conform in shape to the cross sectional shape of the bumper 12 and this not only enhances the appearance of the attachment but also allows the brackets to aid in supporting the attachment on the bumper and to relieve some of the weight from the attachment bolts 16. The bolts 16 may be existing bolts on the truck bumper and, in any event, each mounting bracket 13 has a pair of apertures 17 formed in the contoured plate extension 15 to receive the bolts 16, which also extend through registering openings in the bumper. In this manner, the mounting of the carrier on the vehicle is very secure and rattle-proof and rigid.

The carrier further comprises a short upstanding vertical post 18 on the support bar 11, welded thereto at the center thereof, and a right angular forwardly extending horizontal support arm 19 is rigidly secured to the top of the post 18, as shown. The elements 18 and 19 may also be formed as box sections for lightness and rigidity. The elements 18 and 19 are located at the longitudinal center of the attachment and the transverse center of the vehicle. As shown, the arm 19 projects sufficiently forwardly of the bar 11 so that the supported tire 20 will clear the bar 11 and will not interfere with the bumper. Also, the elevation of the arm 19 on the attachment is such that the bottom of the supported tire 20, FIGURE 1, will have adequate ground clearance and will project only slightly below the bumper 12, if at all, depending to some extent on the particular size of the tire casing.

The forward end of the horizontal arm 19 carries a wheel mounting head 21 rigid therewith and this head consists of a vertical base plate 22 welded directly to the front end of the arm 19 and having a central screw-threaded opening 23 for the reception of a special mounting bolt or pin 24 having a forward hexagon head 25 and preferably a ring element 26 rigid with the head.

At its top, the plate 22 carries a locator pin 27 rigid therewith, which is received through one of the lug bolt holes in a conventional automotive wheel 28, said wheel having the tire 20 mounted thereon. The locator pin supports part of the weight of the wheel and tire. A piloting ring 29 is welded to the front face of plate 22 in surrounding concentric relationship with the threaded opening 23. This ring engages through the usual central opening of the wheel 28 and serves to support and center the wheel on the carrier structure.

A retaining disc 30 is provided having a central opening 31 to receive the bolt 24 and the disc abuts the front of the ring 29 when the parts are assembled, as best shown in FIGURE 3. The peripheral edge of the disc 30 engages a flange part 38 of the wheel 28 to secure the wheel against rattling or movement, and in this connection, when the retaining bolt 24 is securely tightened, the disc 30 will clamp the spare wheel firmly against the plate 22 while its weight is being borne by the elements 27 and 29 and partly by the clamping action. The assembly is rendered very easy and secure in the above manner, and the spare wheel may be quickly mounted and dismounted from its support while possessing the other major advantages already enumerated, including improved weight distribution and ready accessibility, when needed.

For further security against theft, an apertured lug 33 on the plate 22 is disposed just inside of the ring 29, FIGURE 3, and projects forwardly thereof through a slot 34 in retaining disc 30. The lug 33 has an opening 35 to receive a padlock 36, as shown in the drawings, rendering the wheel and tire secure against theft.

The economies and advantages of the attachment should now be readily apparent to those skilled in the art, without the necessity for any further detailed description.

I claim:
1. A spare wheel and tire carrier for pick-up trucks and the like and mountable upon the front bumper of the truck, said carrier comprising an elongated main support bar which extends horizontally and transversely in advance of the bumper and near the top of the bumper during use, mounting brackets secured to the opposite ends of the support bar and projecting somewhat rearwardly thereof and including contoured parts directly engaging the bumper and conforming to the cross sectional shape thereof and adapted to be bolted to the bumper, an upstanding post on the support bar substantially at the longitudinal center thereof, a forwardly extending arm on the top of the post projecting forwardly of the support bar, and a spare wheel and tire receiving head including retainer means on the forward end of said arm for bodily supporting the spare wheel and tire in a substantially vertical plane somewhat forwardly of the bumper and with the major portions of the wheel and tire above the bumper.

2. A spare wheel and tire carrier in accordance with claim 1, and wherein said head comprises a substantially vertical plate secured to the forward end of the arm and having a central screw-threaded opening, a wheel piloting ring secured to the forward face of the plate and surrounding the opening concentrically, a forwardly projecting locator pin on the plate radially outwardly of the ring, a retainer disc adapted to abut the ring and having a central opening, and a threaded fastener element insertable through the opening of the disc and having screw-threaded engagement within the opening of said plate and operable to cause the disc to clampingly secure the spare wheel against the plate with said piloting ring extending through a central opening of the spare wheel and bearing the weight of the wheel in conjunction with said pin.

3. A spare wheel and tire carrier in accordance with claim 2, and wherein said disc has a slot formed therein, and an apertured lug on said plate within said ring and extending forwardly of the ring and engaging through the slot of the disc with the opening of the lug disposed forwardly of the disc to receive a padlock.

4. A spare wheel and tire carrier in accordance with claim 2, and wherein the locator pin is disposed near the top of the plate and above the ring and said threaded central opening.

5. A spare wheel and tire carrier in accordance with claim 1, and wherein each mounting bracket comprises a substantially vertical plate secured directly to one end of the main support bar, and a contoured bumper-engaging extension on the plate substantially at right angles thereto and having a pair of openings to receive bolts which project through the extension and through existing openings of the bumper.

References Cited
UNITED STATES PATENTS

| | | | |
|---|---|---|---|
| 2,709,545 | 5/1955 | Cryer | 224—42.04 |
| 3,343,736 | 9/1967 | Sellers | 224—42.06 |

ROBERT G. SHERIDAN, *Primary Examiner.*